United States Patent [19]

Miyamoto

[11] 4,204,905
[45] May 27, 1980

[54] TAPING MACHINE

[75] Inventor: Saburo Miyamoto, Ibaraki, Japan

[73] Assignee: Nitto Denki Kogyo Kabushiki Kaisha (Nitto Electric Industrial Co., Ltd.), Osaka, Japan

[21] Appl. No.: 931,281

[22] Filed: Aug. 4, 1978

[30] Foreign Application Priority Data

Aug. 19, 1977 [JP] Japan .................. 52/111327[U]

[51] Int. Cl.² .............................................. B31F 1/00
[52] U.S. Cl. .................................. 156/351; 156/355; 156/468; 156/487
[58] Field of Search ................ 156/468, 486–489, 156/DIG. 6, 422, 460, 361, 366, 353, 355, 351; 242/4 B, 4 C, 6

[56] References Cited

U.S. PATENT DOCUMENTS

| | | | |
|---|---|---|---|
| 1,837,840 | 12/1931 | Slusher | 156/468 X |
| 1,944,142 | 1/1934 | Abbott et al. | 156/468 X |
| 2,118,527 | 5/1938 | Schmutzer et al. | 156/487 X |
| 2,909,019 | 10/1959 | McBride | 156/DIG. 6 |
| 3,182,438 | 5/1965 | Myers et al. | 156/487 X |
| 3,321,352 | 5/1967 | Sejda | 156/468 |
| 3,718,523 | 2/1973 | Mallory et al. | 242/4 B X |
| 4,014,731 | 3/1977 | Muto | 156/468 X |
| 4,097,321 | 6/1978 | Kelly et al. | 242/4 B X |

FOREIGN PATENT DOCUMENTS 681336 10/1952 United Kingdom .............. 156/DIG. 7

Primary Examiner—David A. Simmons
Attorney, Agent, or Firm—Wenderoth, Lind & Ponack

[57] ABSTRACT

A taping machine used to wind an adhesive tape around e.g. a joined cable is disclosed. It comprises a rotor rotatably mounted on a frame, drive means for the rotor, tape feed means, and tape cutting means. The rotor has a radial opening, on the opposite inner walls of the radial opening are mounted brushes. The article to be taped is pushed into the radial opening and between the brushes, subsequently the rotor starts to turn. As it turns, the tape is tightly wound around the article by frictional action of the brushes.

3 Claims, 8 Drawing Figures

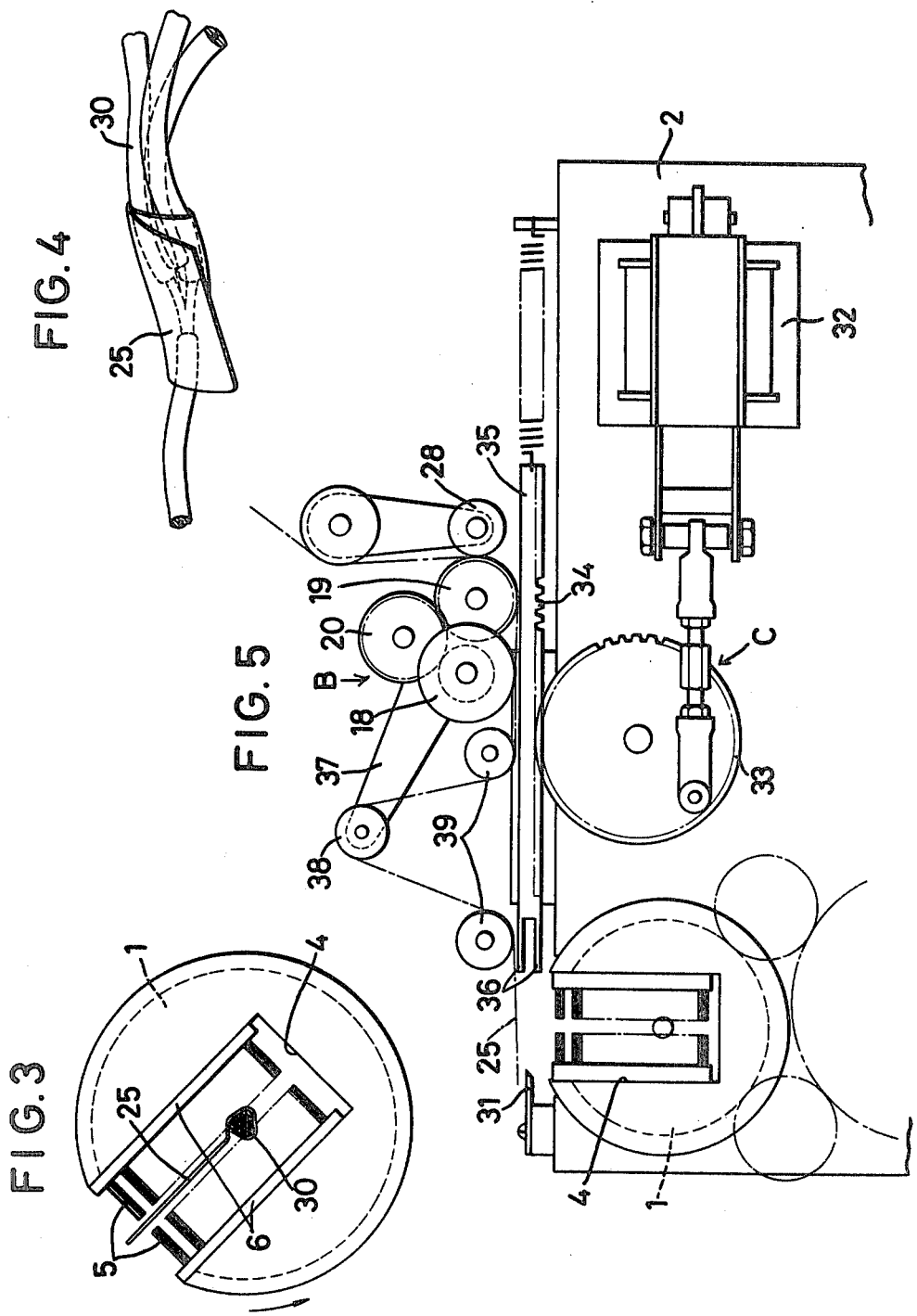

TAPING MACHINE

BACKGROUND OF THE INVENTION

The present invention relates to a taping machine, and particularly to a machine used to wind an adhesive tape for insulation around e.g. the joint of a cable where the coverings are partially removed.

A taping machine of this type is shown, for example, in Japanese Patent Publication No. SHO 49-27555 and U.S. Pat. Nos. 3,321,352 and 3,418,358. Such conventional devices comprise a rotor driven by a suitable drive means and having a pair of plate springs mounted therein. After the cable having an adhesive tape partially attached has been pushed into position between the plate springs, the rotor starts. As it turns, the tape is wound around the cable by the pressing action of the springs. Such a conventional device has the disadvantage that because the pressure applied by the plate springs is dependent on the size of the object to be taped, the plate springs fail to offer a uniform winding force and, in some cases, apply excessive torque or twist the object. This is true particularly if the object has a rectangular or elliptical shape. Also, if the object to be taped has a tapered shape, the adhesive tape is taped not straight but obliquely along the taper.

SUMMARY OF THE INVENTION

An object of this invention is to provide a taping machine which obviates the aforesaid disadvantages.

According to the present invention, there is provided a taping machine comprising a frame, a rotor rotatably mounted on the frame and having a radial opening extending from its periphery beyond its axis, drive means for giving said rotor a predetermined number of turns, means for feeding an adhesive tape into position over the rotor, means for cutting the tape to a predetermined length, the rotor carrying a brush on each of the opposite inner walls of the opening for winding the tape around the object by frictional action as the rotor turns.

In one aspect of the present invention, the arrangement is such that when the object with a tape is pushed into the opening in the rotor, first the tape cutting means operates to cut the tape, and when the object with the cut tape is further pushed to the bottom of the opening, the rotor starts to rotate for taping and simultaneously the tape feed means operates to advance the adhesive tape for the next cycle of taping.

In another aspect of the present invention, both the tape feeding and cutting for the next taping are performed while the rotor is turning to wind the tape around the object. Thus, at the start of the next cycle of operation, the adhesive tape already cut to a predetermined length is in a standby position over the opening in the rotor.

BRIEF DESCRIPTION OF THE DRAWINGS

Other objects and advantages of this invention will become apparent from the following description taken with reference to the accompanying drawings, in which:

FIG. 3 is an enlarged side view of the rotor;

FIG. 4 is a perspective view showing the cable with its joint covered with a tape;

FIG. 5 is a partial side view of the second embodiment;

DETAILED DESCRIPTION OF THE INVENTION

Figure 1:
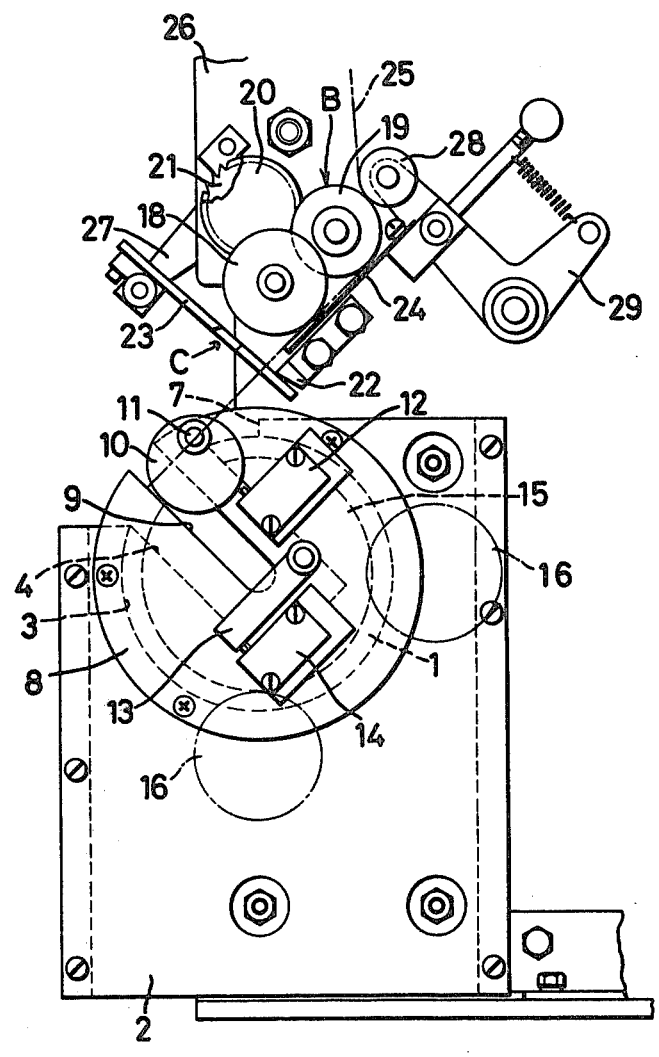
FIG. 1 is a side view of the first embodiment of this invention.
Figure 2:
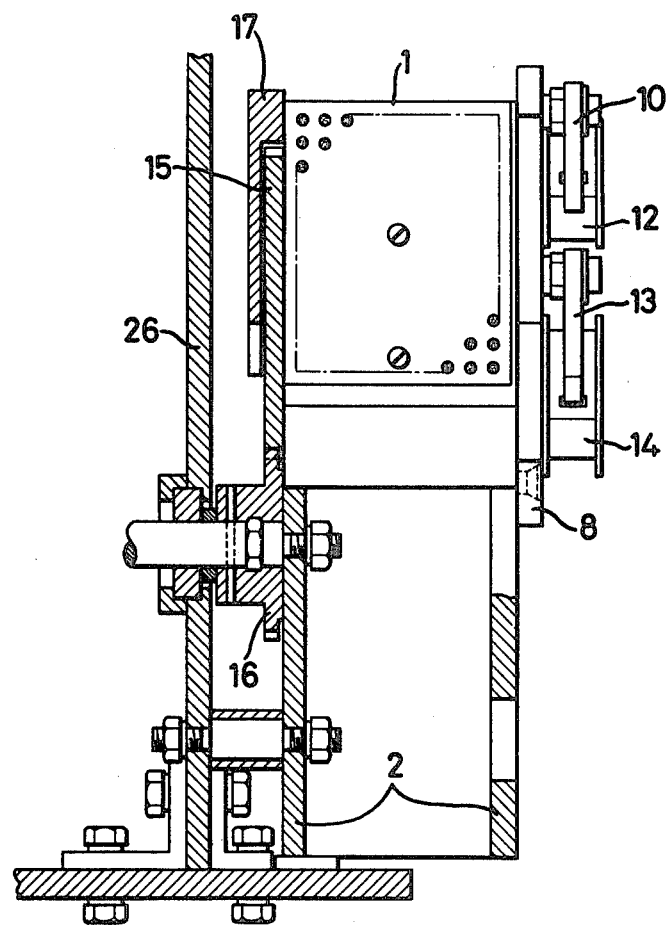
FIG. 2 is a vertical sectional front view thereof.

Referring to FIGS. 1 and 2 showing the first embodiment of the present invention, a cylindrical rotor 1 is rotatably mounted on a frame 2 in a socket 3 formed therein. The mouth 7 of the socket is narrower than the diameter of the rotor to prevent the rotor from coming out of the socket and off the frame. The rotor 1 has a deep radial opening 4 extending from its outer periphery to a point beyond its axis. A brush constituted by bristle 5 on a plate 6 is mounted on each of the opposite inner walls of the opening 4.

The frame 2 comprises two side plates spaced from each other at a distance substantially to the width of the rotor 1. (FIG. 2) A round plate 8 is fixed to the outside of one side plate to prevent the rotor 1 from axially separating. The plate 8 also has a notch 9 narrower than the opening 4 in the rotor and extending from the center of the mouth of the socket 3 inwardly beyond the axis of the rotor.

Adjacent to the mouth 7 of the notch 9, a disc cam 10 is eccentrically mounted on the plate 8 on a pivot 11 and is biassed by a spring (not shown) so as to project into the notch 9. When pressed against the bias of the spring, the cam actuates a limit switch 12 mounted on the plate 8. Also, an actuator 13 is pivoted on the plate 8 at the bottom of the notch 9 to actuate another limit switch 14 mounted on the plate 8.

To the other side of the rotor 1 is secured a gear 15 having a slightly smaller diameter than the rotor and having a notch corresponding to the notch 9. The gear 15 engages two gears 16 of smaller diameter mounted on the other side of the frame 2 and coupled with a suitable drive means. When the actuator 13 is pushed to operate the limit switch 14, the drive means starts to rotate the rotor 1 for a predetermined number of turns. The gear 15 is protected by a cover 17 secured to the frame 2. The cover also has a corresponding notch.

The tape feed means B mounted on a frame 26 comprises a pair of feed rollers 18, 19 a drive gear 20, engaging gears mounted on the shafts of these feed rollers for driving the drive gear 20, drive means made operable by the limit switch 14 for rotating the drive gear 20 a predetermined number of turns, and a ratchet wheel 21 for preventing a reverse rotation of the gear 20. Since the feed rollers 18 and 19 are in contact with the adhesive side of the adhesive tape 25 coming from a tape spool (not shown), they are each made up of a set of discs having a common axis but suitably spaced from one another and arranged so that one set of discs is partially disposed between the other set of discs. Additionally, the roller 18 is adapted to run at a higher speed than the roller 19.

The tape cutting means C comprises a fixed blade 22 fixed to the frame 26, a movable blade 23 attached to the tip of cutter arm 27 pivotally attached the frame 26, and a tape guide plate 24 which ensures continuous contact of the tape 25 with the rollers 18, 19 without any slip, the rollers feeding the tape toward the rotor 1. The guide plate 24 keeps the tape in an inverted V shape so as to prevent it from hanging down. When the cam 10 actuates the limit switch 12, an electromagnet (not shown) actuates the cutter arm 27 so that the movable blade 23 engages the fixed blade 22 to cut the tape. A rubber roller 28 is pivotally attached to the end of an L-shape arm 29 which is pivotally attached to the frame 26 and biassed by a spring in a counterclockwise direction. Thus, the roller 28 keeps the tape 25 in contact with the roller 19.

In operation of the first embodiment, e.g. a plurality of cables with their covering partially removed are joined to a cable, as shown in FIG. 4. The joined cable 30 is laterally placed on the end of the tape 25 that has already been fed into position over the opening 4 with its adhesive side up, and is pushed into position between the brushes 5. This moves the cam 10 to actuate the limit switch 12, which operates the cutter arm 27 so that the movable blade 23 cooperates with the fixed blade 22 to cut the tape 25. When the cable 30 with the cut tape partially wound therearound is further pushed into the opening 4 as in FIG. 3 it pushes the actuator 13, which then turns the limit switch 14 and causing the rotor to rotate in the direction of the arrow in FIG. 3. As it rotates with the cable being held by hand, the tape 25 is then tightly wound around the cable joint by the frictional action of the brushes. After a predetermined number of turns, the rotor 1 stops automatically at its original position. The tape having now been completely wound around the joint. On the other hand, when the limit switch 14 turns on, the gear 20 and thus the feed rollers 18 and 19 start to feed the tape 25. Since the cutter arm 27 has returned to its original position to be out of way, it permits advancement of the tape. When the rotor 1 stops, the tape stops advancing and goes into taking a standby position over the opening 4.

The second embodiment shown in FIG. 5 employs a tape feed means and a tape cutting means slightly different from those of the first embodiment. The tape feed means B comprises a dancer roller 38 pivoted to the free end of an arm 37 which is pivotally attached to a frame (not shown) and upwardly biassed by a spring. Disposed between two guide rollers 39, the dancer roller 58 serves to take up any slack of the tape running between these guide rollers or to reduce excessive tension.

The tape cutting means C comprises a saw-tooth cutter 31 fixed to the frame 2 and a rod 35 mounted on the same frame, the rod being movable toward the cutter 31. The rod 35 is provided at its bottom portion with a rack 34 for engaging a gear 33 driven by an electromagnet 32 and the rod additionally having at its tip, a pair of projections 36. The rod presses the tape 25, tightly over the projections, and against the fixed cutter 31 thereby cutting it.

Figure 6:
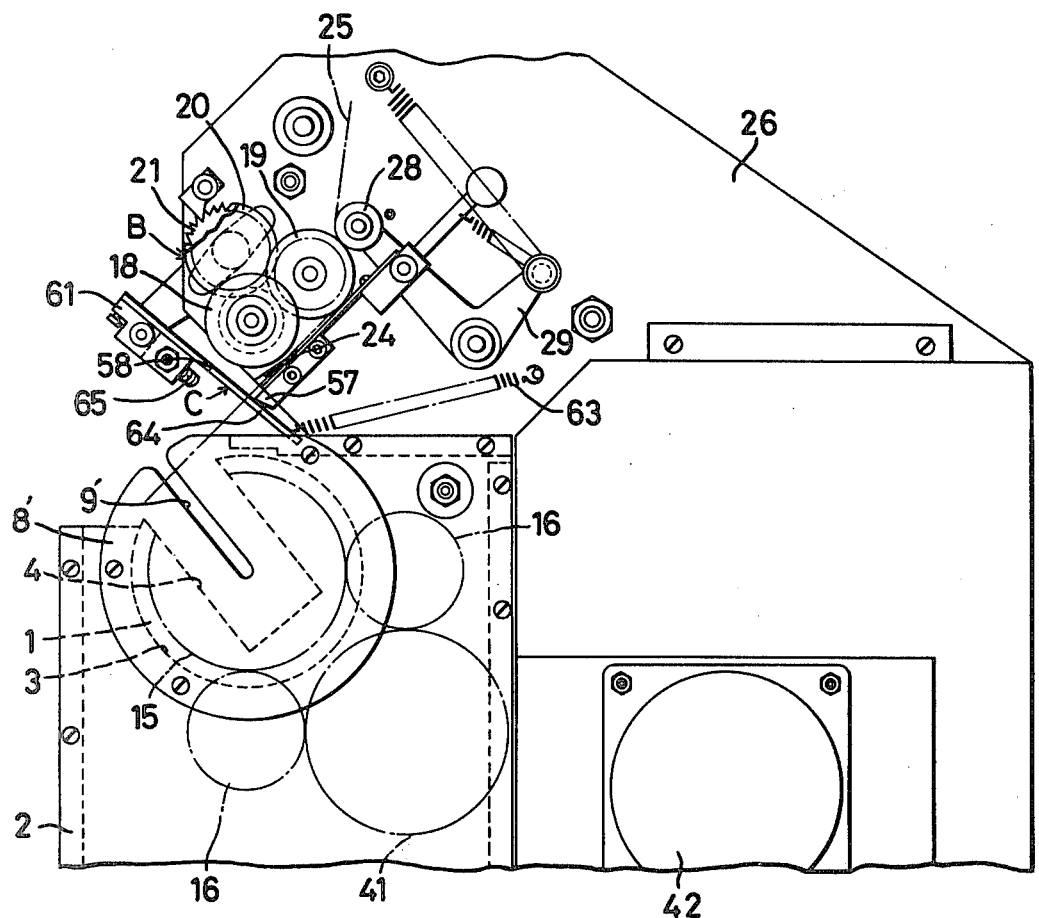
FIG. 6 is a partial side view of the third embodiment as viewed from one side.
Figure 8:
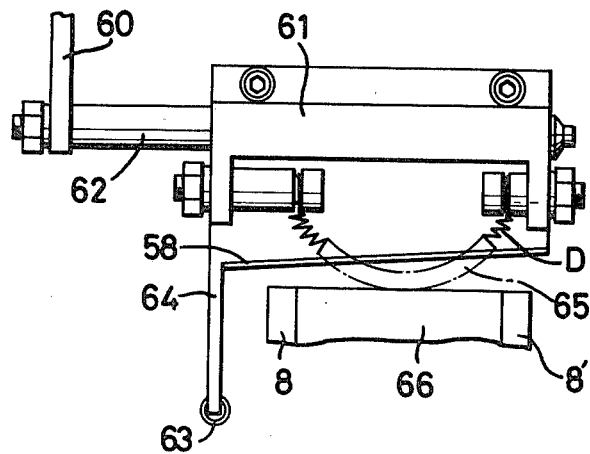
FIG. 8 is an enlarged front view of the movable blade in the third embodiment.
Figure 7:
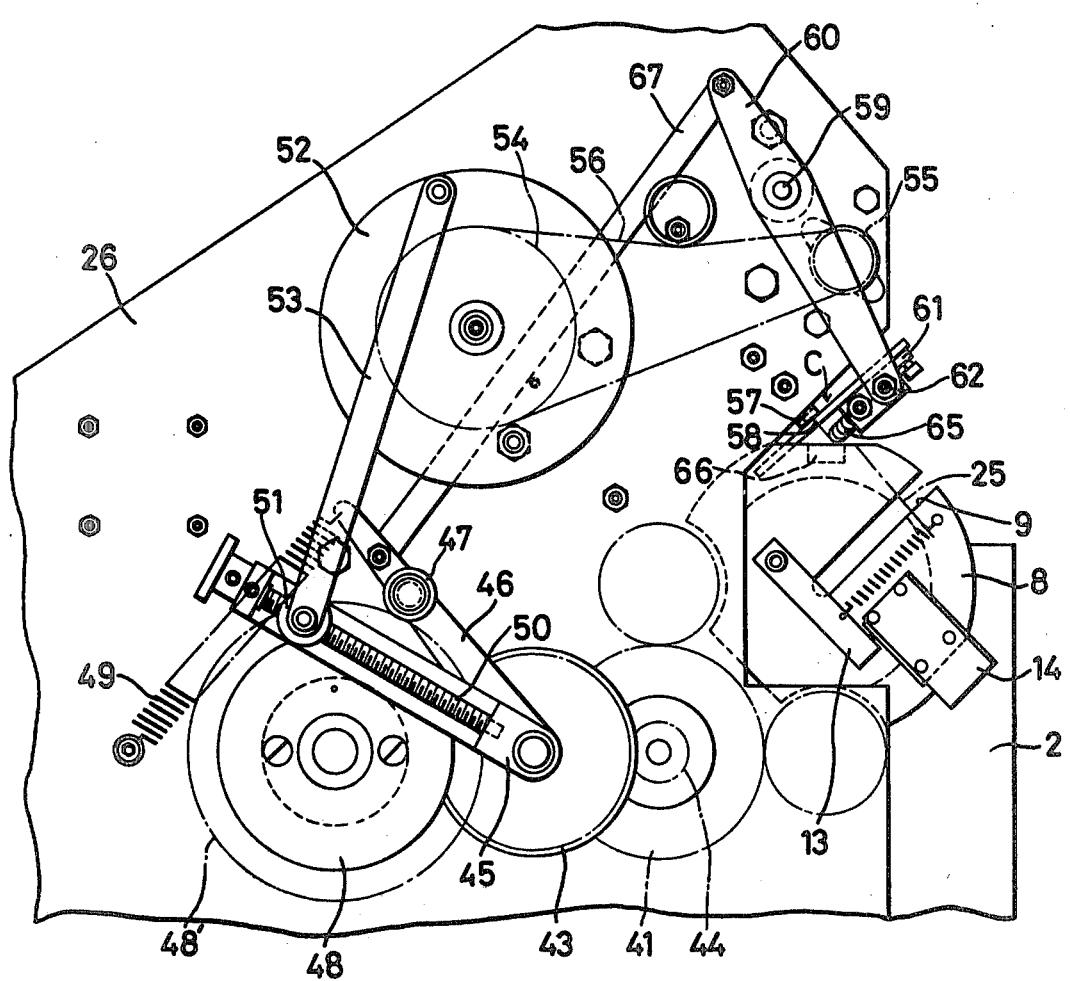
FIG. 7 is a partial side view thereof as viewed from the other side.

The third embodiment shown in FIGS. 6-8 is the same as the first embodiment in a basic configuration. The same reference numbers are used for similar parts.

A round plate 8 (8') is mounted on each side of the frame 2 instead of on one side, said plates having with a notch 9 (9-) narrower than the opening 4 in the rotor 1. Also, the cam 10, the limit switch 12, and the drive means for the gear 20 in the first embodiment are omitted, and instead the third embodiment employs an arrangement which will be described later. The gear 15 engages two gears 16 of smaller diameter which in turn engage a gear 41 mounted on the rear frame 26. On the output shaft of a motor 42 are mounted a cam 48 and a gear (not shown) which is integral with the cam 48, said gear meshing with a gear 43 which engages a gear 44 which is mounted in coaxial relationship with the gear 41. In FIG. 7, a dotted line 48' around the cam 48 designates the locus of a projection on the cam 48.

A rocking shaft 45 and a lever 46 are mounted on the shaft of the gear 43, but are independent of the rotation of the latter. The lever 46 carries a roller 47 and is biassed by a spring 49 to hold the roller 47 against a cam 48 which is driven by the motor 42. Thus, the lever 46 is given one rocking motion per revolution of the cam by the projection of the cam 48. The rocking shaft 45 has a longitudinal groove in its one side in which a cam follower on the cam 48 engages so that the rocking shaft 45 is given one rocking motion per revolution of the cam 48. An adjusting bolt 50 is rotatably mounted on and adjacent the rocking shaft 45. On the bolt 50 is screwed a slider 51, the position of the slider adjustable along the rocking shaft by turning the adjusting bolt 50.

A rotary plate 52 is coupled to the rocking shaft 45 by means of a coupling lever 53 having one end pivotally connected to a peripheral portion of the rotary plate 52 and the other end pivotally connected to the slider 51. Thus, as the rocking shaft 45 rocks, the rotary plate 52 turns through a predetermined angle which is adjustable by adjusting the position of the slider 51. The rotary plate 52 is rotatably mounted on a sprocket 54 having a one-direction clutch. An endless chain 56 passes around the sprocket 54 and a smaller sprocket 55 pivotally mounted to the front end of the frame 26.

The tape feed means B of the third embodiment is basically the same as that of the first embodiment, but the drive gear 20 for the feed rollers is coupled to the sprocket 55. Thus, the rotation of the rotary plate 52 is transmitted through the sprockets 54, 55 to the gear 20. The ratchet 21 prevents a reverse rotation of the gear 20.

The tape cutting means C of the third embodiment comprises a fixed blade 57 fixed to the frame 26 and a movable blade 58 fixed to a mounting frame 61 at the tip of a cutter arm 60 pivotally attached to the frame 26 about a pivot 59. The movable blade 58 is biassed into sliding contact with one side of the fixed blade 57 by means of a spring 63 having one end fixed to the frame 26 and the other end fixed to an extension 64 of the movable blade 58 which serves as a guide. The cutter arm 60 is coupled to the lever 46 by a coupling lever 67.

The mounting frame 61 is pivotally attached to the tip of arm 60 by a shaft 62. As will be seen in FIG. 8, the mounting frame 61 is provided with a pair of downwardly extending legs each traversed by a screw. A coil spring 65 of rough pitch is attached by and between the screws in a downwardly arcuate shape. A tape support 66 is mounted between the plates 8, 8' with the top cut off to provide a plane surface. After the movable blade 58 has moved down to cut the tape, the cut tape is pressed by the spring 65 against the tape support 66. The spring, tape support and the associated parts comprise a tape holding means D.

In the operation of the third embodiment, the joined cable is similarly placed on the end of the adhesive side of the tape 25 and pushed into position between the brushes 5. One difference from the first embodiment is that the tape for the next taping is fed and cut during the taping cycle. When the limit switch 14 is actuated by the cable, the motor 42 starts to rotate the gears 43, 41 and 16 and thus the rotor 1 so that the tape is wound around the cable joint as in FIG. 4.

At the same time, the cam 48 causes the rocking shaft 45 and the lever 46 to rock, rotating the rotary plate 52 and rocking the cutter arm 60, respectively. The rotary plate 52 causes the sprockets 54 and 55 to turn through the one-direction clutch so that the gear 20 turns a predetermined number of turns. Thus, the feed rollers 18, 19 feed the tape 25 into the tape guide plate 24 and into position over the opening 4. On the othe hand, the cutter arm 60 rocks thereby raising the movable blade 58 away from the fixed blade 57. After a predetermined length of tape has been fed, the movable blade 58 lowers.

First the coil spring 65 pushes the tape 25 against the tape support 66 thereby tightening between the support 66 and the rollers 18, 19 so that subsequently the movable blade 58 cuts the tape at a predetermined length. The motor 42 is stopped automatically by means of a one-turn stop mechanism so that the rotor 1 stops at the original position. Now the cut tape for the next taping is held on the tape support 66 by the spring 65.

It will be understood from the foregoing that the rotor having a pair of brushes in its opening permits satisfactory taping even if the object to be taped has a non-uniform outer diameter. The pressing force applied by the brushes does not depend on the diameter or size of the object to be taped. Further, due to the fact that during taping the objects to be taped are not subjected to excessive torque, the taping machine can be used for taping such articles as cables which are subject to twisting.

In the third embodiment, since both the tape feeding and cutting for the next taping are done while the rotor is turning and taping, the tape cut to a predetermined length is ready for use over the opening in the rotor at the start of the next taping. Further, the tape holding means ensures satisfactory cutting of the tape and prevents the cut tape from coming out of position. The coil spring which is attached in a downwardly arcuate shape offers sufficient of holding force without hindering the pulling of the tape off the support 66.

While preferred embodiments of this invention have been described, it is to be understood that various changes and variations may be made without departing from the scope of the following claims. For example, the coil spring for holding the tape may be replaced by a roller rotatable only in a tape-pulling direction.

What are claimed are:

1. A taping machine for winding an adhesive tape around an object such as a cable, said machine comprising:
    (a) a rotor mounted in said machine for rotation having a radial opening extending from its outer periphery beyond its axis;
    (b) a drive means connected to said rotor for rotating said rotor a predetermined number of turns per cycle of operation;
    (c) a tape feed means for feeding the adhesive tape into position over said rotor;
    (d) a tape cutting means adjacent the path of feed of the tape for cutting the tape to a predetermined length;
    (e) a brush on each of the opposite walls of said radial opening for winding the tape around the object by frictional action as the rotor turns with the object held in the opening;
    (f) a first detector means located near the mouth of said radial opening and connected to said tape cutting means, for actuating said tape cutting means as the object is inserted into said radial opening; and
    (g) a second detector means located further from the mouth of said radial opening than said first detector means and connected to said drive means and said tape feed means, for actuating said drive means and said tape feed means as the object is inserted into said radial opening.

2. A taping machine for winding an adhesive tape around an object such as a cable, said machine comprising:
    (a) a rotor mounted in said machine for rotation having a radial opening extending from its outer periphery beyond its axis;
    (b) a drive means connected to said rotor for rotating said rotor a predetermined number of turns per cycle of operation;
    (c) a tape feed means for feeding the adhesive tape into position over said rotor;
    (d) a tape cutting means adjacent the path of feed of the tape for cutting the tape to a predetermined length;
    (e) a brush on each of the opposite walls of said radial opening for winding the tape around the object by frictional action as the rotor turns with the object held in the opening;
    (f) a detector means disposed adjacent to the lower portion of said radial opening and connected to said drive means, for actuating said drive means upon insertion of the object to be taped into said radial opening;
    (g) interlocking means connected to said tape feed means, said tape cutting means, and said drive means, for winding the tape around said object to be taped while said rotor is turning and feeding and cutting the tape for the next taping simultaneously; and
    (h) tape holding means for holding the tape for the next taping.

3. A taping machine as defined in claim 2, wherein said tape holding means comprise a frame, a movable cutting means carried by said frame, a tape support means, and a spring means mounted on said frame and extending in a downward direction for pressing the tape against said tape support means.

* * * * *